(12) United States Patent
Fukui

(10) Patent No.: US 10,185,527 B2
(45) Date of Patent: Jan. 22, 2019

(54) PRINTED SYSTEM, IMAGE DISPLAY APPARATUS, IMAGE DISPLAY METHOD, AND NON-TRANSITORY COMPUTER READABLE MEDIUM

(71) Applicant: FUJI XEROX CO., LTD., Tokyo (JP)

(72) Inventor: Takeshi Fukui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/439,174

(22) Filed: Feb. 22, 2017

(65) Prior Publication Data

US 2018/0052645 A1 Feb. 22, 2018

(30) Foreign Application Priority Data

Aug. 16, 2016 (JP) .................. 2016-159423

(51) Int. Cl.
*G06F 3/12* (2006.01)
*G06K 15/02* (2006.01)

(52) U.S. Cl.
CPC ............ *G06F 3/1256* (2013.01); *G06F 3/125* (2013.01); *G06F 3/1208* (2013.01); *G06F 3/1229* (2013.01); *G06F 3/1263* (2013.01); *G06F 3/1282* (2013.01); *G06F 3/1285* (2013.01); *G06K 15/1836* (2013.01); *G06K 15/1868* (2013.01)

(58) Field of Classification Search
CPC .... G06F 3/1256; G06F 3/1208; G06F 3/1229; G06F 3/125; G06F 3/1263; G06F 3/1282; G06F 3/1285; G06K 15/1836
USPC ........................................................ 358/1.15
See application file for complete search history.

(56) References Cited

U.S. PATENT DOCUMENTS

2001/0044868 A1* 11/2001 Roztocil ............... G06F 17/212
358/1.1
2003/0103221 A1* 6/2003 Natori ................... G06F 3/1205
358/1.9
(Continued)

FOREIGN PATENT DOCUMENTS

JP 2002-010000 A 1/2002
JP 2012-118676 A 6/2012

OTHER PUBLICATIONS

Tanaka, Motonori; JP 2007004676; Jan. 2007; pp. 1 and 2 (Abstract and Solution).*

*Primary Examiner* — Neil R McLean
(74) *Attorney, Agent, or Firm* — Oliff PLC

(57) ABSTRACT

A printing system including a client device which generates a job including a pair of first image data and attachment data, and a printing apparatus which includes a paper accommodation unit accommodating paper, receives the job from the client device, converts the first image data into second image data for printing by RIP processing, and prints an image based on the second image data on paper, includes a job specification unit, an image generation unit, and an image display. The job specification unit specifies any job in a stage previous to the conversion into the second image data by the RIP processing. The image generation unit generates, based on the attachment data forming the job specified by the job specification unit, an image obtained by editing a thumbnail image based on the first image data to a printing layout. The display displays the image generated by the image generation unit.

8 Claims, 7 Drawing Sheets

(56) References Cited

U.S. PATENT DOCUMENTS

2005/0243372 A1* 11/2005 Sato .................. G06F 3/1205
                                                358/1.18
2007/0165248 A1*  7/2007 Utsunomiya ........ G06F 3/1208
                                                 358/1.1
2009/0091770 A1*  4/2009 Kano ................ H04N 1/00132
                                                 358/1.1
2014/0293351 A1* 10/2014 Kurihara ............. G06F 3/1253
                                                358/1.15

* cited by examiner

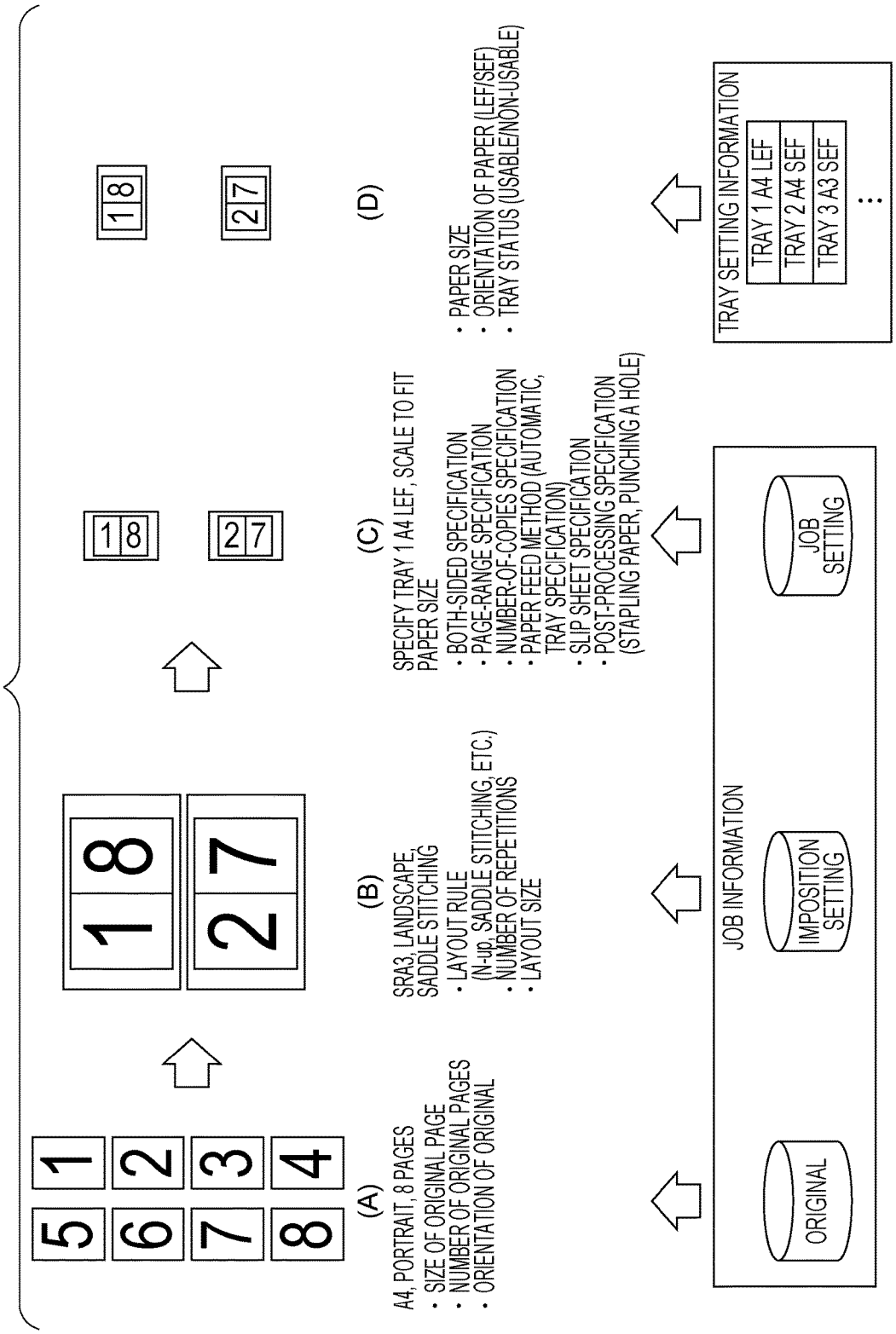

FIG. 5A  FIG. 5B  FIG. 5C
PAPER TRANSPORT DIRECTION →  PAPER TRANSPORT DIRECTION →  PAPER TRANSPORT DIRECTION →
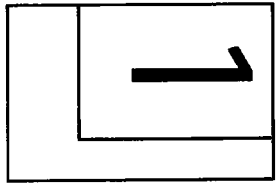
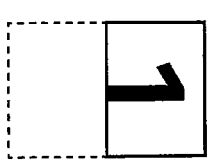
FIG. 6A  FIG. 6B
PAPER TRANSPORT DIRECTION →  PAPER TRANSPORT DIRECTION →

PRINTED SYSTEM, IMAGE DISPLAY APPARATUS, IMAGE DISPLAY METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-159423 filed Aug. 16, 2016.

BACKGROUND

(i) Technical Field

The present invention relates to a printing system, an image display apparatus, an image display method, and a non-transitory computer readable medium.

(ii) Related Art

For printing with a large printing apparatus such as a production printing apparatus, to confirm what printing result may be obtained prior to printing, preview display using a thumbnail image has been provided.

Known preview display includes two types:

(1) preview display for displaying a thumbnail image for each page of an original, based on original data before raster image processor (RIP) processing is performed; and (2) preview display for displaying a thumbnail image of a printing image regarding imposition or the like, based on print data after RIP processing is performed.

Preview display (1) is based on original data before RIP processing, which takes a long time, is performed, and therefore, simple confirmation is possible. However, for example, in the case where imposition or the like is performed, the preview image is different from the actual printing image.

In contrast, preview display (2) is based on print data after RIP processing is performed, and therefore, preview display which matches the actual printing image regarding imposition or the like is provided. However, for preview display (2), RIP processing needs to be performed prior to the preview display. Therefore, it takes a time to provide preview display. Furthermore, in the case where a setting change which may cause a change in the result of RIP processing, such as a change in imposition, is performed, RIP processing needs to be performed again.

SUMMARY

According to an aspect of the invention, there is provided a printing system including a client device which generates a job including a pair of first image data representing a set of images and attachment data necessary for printing an image based on the first image data, and a printing apparatus which includes a paper accommodation unit accommodating paper to be used for printing, receives the job from the client device, converts the first image data forming the job into second image data for printing by RIP processing, and prints an image based on the second image data on paper, including a job specification unit, an image generation unit, and an image display. The job specification unit specifies any job in a stage previous to the conversion into the second image data by the RIP processing. The image generation unit generates, based on the attachment data forming the job specified by the job specification unit, an image obtained by editing a thumbnail image based on the first image data forming the job to a printing layout. The image display displays the image generated by the image generation unit.

BRIEF DESCRIPTION OF THE DRAWINGS

Exemplary embodiments of the present invention will be described in detail based on the following figures, wherein:

FIG. 4 is a schematic diagram illustrating an example of a "simplified" preview image generation process;

FIGS. 5A, 5B, and 5C are diagrams illustrating the relationship between specification of a paper feed method and a thumbnail image;

FIGS. 6A and 6B are diagrams illustrating a preview image taking into consideration the orientation of paper based on post-processing specification;

DETAILED DESCRIPTION

Hereinafter, exemplary embodiments of the present invention will be described.

In the exemplary embodiments described below, all the images other than the ones printed on paper are data images. Hereinafter, data images may be simply represented as "images", for example, without clearly representing data images as "image data". The same applies to other terms such as originals, which belong to the category of images.

Figure 1:
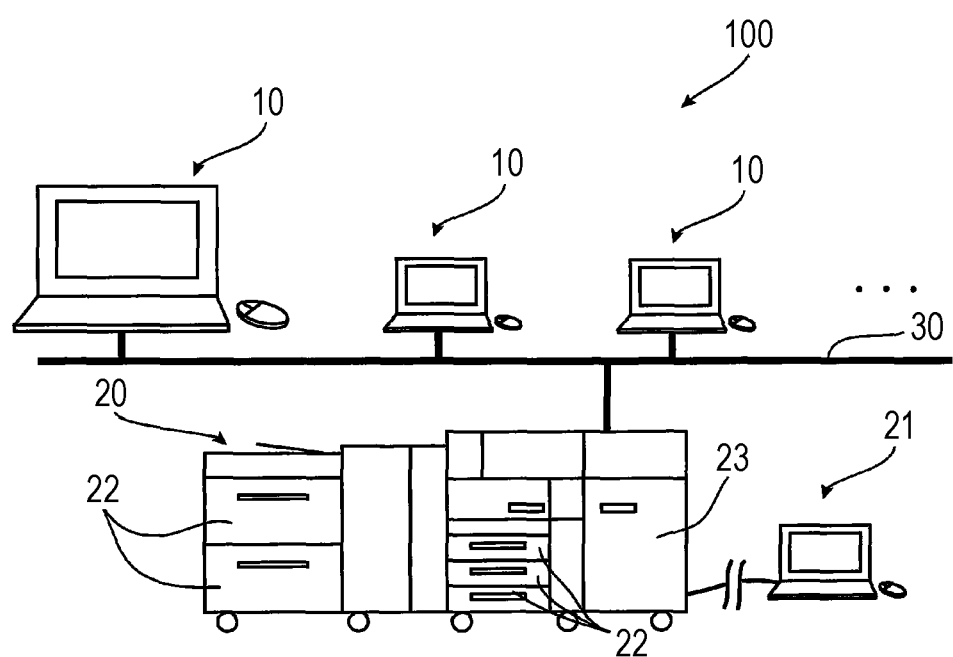
FIG. 1 is a conceptual diagram illustrating the entire configuration of a printing system.

FIG. 1 is a conceptual diagram illustrating the entire configuration of a printing system. The printing system illustrated in FIG. 1 corresponds to a printing system according to an exemplary embodiment of the present invention.

A printing system 100 illustrated in FIG. 1 includes multiple client personal computers (PCs) 10 and a printing apparatus 20. The multiple client PCs 10 and the printing apparatus 20 are connected to one another via a local area network (LAN) 30.

The client PCs 10 perform image editing processing in accordance with a user operation. The client PCs 10 each correspond to an example of a client device according to an exemplary embodiment of the present invention.

An image generated by image editing processing at each of the client PCs 10 will be referred to as an "original". An "original" corresponds to an example of first image data according to an exemplary embodiment of the present invention. Furthermore, at each of the client PCs 10, an "original" generated by image editing processing is associated with "attachment information" which is necessary for printing of the "original". A pair of an "original" and "attachment information" will be referred to as a "job". "Attachment information" corresponds to an example of attachment data according to an exemplary embodiment of the present invention. The details of "attachment information" will be described later.

Jobs generated at the client PCs 10 are transmitted to the printing apparatus 20. The printing apparatus 20 has a function to temporarily store the jobs transmitted from the client PCs 10 and then sequentially print and output the jobs on paper. To the printing apparatus 20, a PC 21 which functions as a user interface (UI) of the printing apparatus 20 is connected.

Prior to printing, the printing apparatus 20 performs RIP processing on an "original" to generate output data for printing. Then, the printing apparatus 20 prints an image based on the generated output data on paper. The output data corresponds to an example of second image data according to an exemplary embodiment of the present invention.

Multiple (in this example, five) paper feed trays 22 are provided at the printing apparatus 20. In the paper feed trays 22, sheets of paper of sizes set for the individual paper feed trays 22 are stacked and accommodated in orientations set for the individual paper feed trays 22. Sheets of paper accommodated in the paper feed trays 22 are picked up one by one and used for print output. The orientation of paper accommodated in the paper feed trays 22 includes two types: long edge feed (LEF), and short edge feed (SEF). LEF is an orientation in which long sides of paper are set to the front edge and the rear edge in a paper transport direction when the paper is picked up from the paper feed trays 22 and transported. SEF is an orientation in which short sides of paper are set to the front edge and the rear edge in the paper transport direction when the paper is picked up from the paper feed trays 22 and transported. The size and orientation of paper accommodated in each of the paper feed trays 22 may be set in a desired manner. Setting information of the paper feed trays 22 (information of the size and orientation of paper accommodated in the paper feed trays) are stored in advance in the printing apparatus 20 as "tray setting information" in association with the paper feed trays 22. A sensor for detecting whether or not each of the paper feed trays 22 is empty is provided at the paper feed tray 22. An image is printed on one side or both sides of paper picked up from each of the paper feed trays 22, in accordance with a job.

Furthermore, a post-processor (not illustrated in FIG. 1) for punching a hole or stapling paper is built in the printing apparatus 20. However, for example, stapling paper may be performed in a limited area of paper such as an area near the rear edge in the paper transport direction.

An image is printed on one side or both sides of paper picked up from any one of the multiple paper feed trays 22, in accordance with a job instruction. If the job instruction indicates post-processing, post-processing such as punching a hole or stapling paper is performed in accordance with the instruction, and the paper is sequentially stacked on a paper output tray 23.

Hardware such as the client PCs 10 and the printing apparatus 20 is widely known general-purpose technology, and therefore, illustration and explanation for the hardware configuration will be omitted.

For transmission of a job from a client PC 10, setting may be performed such that print output based on the job is immediately started or such that the job is temporarily held inside the printing apparatus 20. That is, in a case where the client PC 10 transmits a job to the printing apparatus 20 while issuing an instruction to suspend print output, print output is not performed immediately, and the transmitted job is held inside the printing apparatus. After an instruction to perform print output is received, print output is performed.

Figure 2:
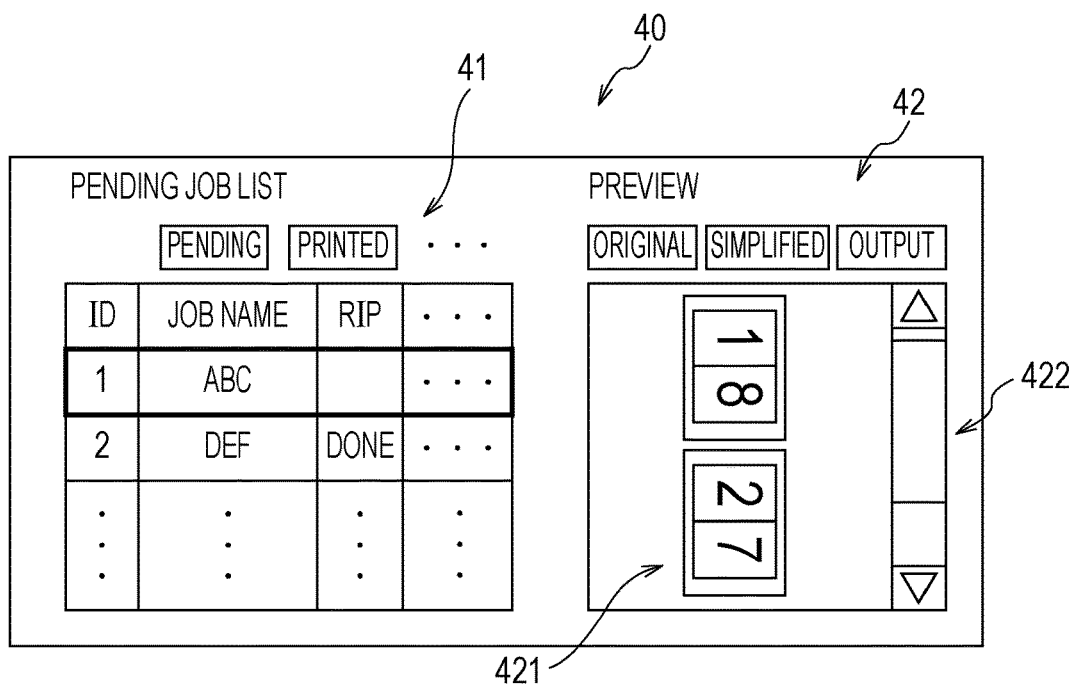
FIG. 2 is a diagram illustrating an example of a job list screen.

FIG. 2 is a diagram illustrating an example of a job list screen.

When the PC 21 attached to the printing apparatus 20 is operated to open a job list screen 40 and a "pending" tab is pressed on the job list screen 40, a pending job list screen 41 and a preview screen 42 illustrated in FIG. 2 are displayed. In the pending job list screen 41 illustrated in FIG. 2, a job with an ID of 1 and a job name of ABC and a job with an ID of 2 and a job name of DEF are indicated. An "RIP" field for the job with the ID of 1 and the job name of ABC is blank. This indicates that RIP processing has not yet been performed on the job. In contrast, "Done" is described in an "RIP" field for the job with the ID of 2 and the job name of DEF. This indicates that RIP processing has already been performed on the job. However, even for a job on which RIP processing has already been performed, if a setting change which affects the RIP processing result is performed for the job, "Done" in the "RIP" field for the job is deleted and the "RIP" field becomes blank.

When one of pending jobs indicated on the pending job list screen 41 is selected and one of three tabs: "original", "simplified", and "output", for preview display is pressed, a preview image 421 of the selected job is displayed in accordance with the pressed tab. The preview image 421 illustrated in FIG. 2 is a "simplified" image created as described later with reference to FIG. 4. When a scroll bar 422 on a side of the preview image 421 is operated, a remaining image of the preview image 421 is displayed. The details of a preview image will be described later.

The job list illustrated in FIG. 2 may be indicated on the display screen of each of the client PCs 10. However, for a general user, only a job transmitted from the user's own client PC 10 may be indicated. In the case where a user logs in as an administrator, all the pending jobs are indicated, regardless of which user (client PC 10) is logged in.

Figure 3:
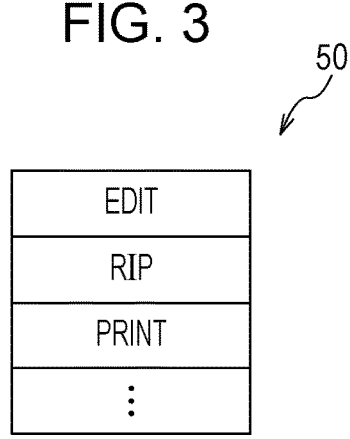
FIG. 3 is a diagram illustrating a job menu screen.

FIG. 3 is a diagram illustrating a job menu screen.

When any of pending jobs is selected on the pending job list screen 41 illustrated in FIG. 2 and right-clicking or the like is performed, a job menu screen 50 regarding the job is opened. On the job menu screen 50, items including "edit", "RIP", and "print" are arranged. "Edit" is an item to be pressed to open an original of the job and perform confirmation or editing of the original. "RIP" is an item to be pressed to issue an instruction to perform RIP processing for the job. "Print" is an item to be pressed to issue an instruction to perform printing based on the job. On the job menu screen 50, for example, items to be pressed to perform confirmation or correction of attachment information of the job and various other items, which are not illustrated in FIG. 3, are arranged. However, explanation for those items will be omitted.

FIG. 4 is a schematic diagram illustrating an example of a "simplified" preview image generation process.

As illustrated in FIG. 2, there are three tabs for preview display: "original", "simplified", and "output". When the "simplified" tab is pressed, processing for preview display is performed, as illustrated in FIG. 4. In the explanation of "simplified" preview display provided below with reference to FIG. 4, "original" preview display and "output" preview display" will also be mentioned.

FIG. 4(A) and FIG. 4(B) illustrate a process to generation of a preview image, and FIG. 4(C) or FIG. 4(D) is a generated preview image. Furthermore, to avoid complicated illustration, only preview images for the first two pages are illustrated.

As illustrated in FIG. 4, job information defining a job includes "original", "imposition setting", and "job setting".

As described above, "original" represents image data generated by image editing processing at the client PCs 10.

"Original" also includes information regarding the size per page of the original, the number of pages, orientation, and the like. As illustrated in FIG. 4(A), an original of "A4 size, portrait, eight pages" is defined.

"Imposition setting" and "job setting" are attachment information attached to an "original". "Imposition setting" is information defining a method for arranging an original on paper. As "imposition setting", layout rules such as N-up layout and saddle stitching, the number of repetitions, and the layout size are set. N-up layout represents that an original for one sheet is composed of an N-page original. Saddle stitching is an example of definition of the arrangement order of an original which is to be finished as a booklet. The number of repetitions represents information defining how many sheets of the same original are arranged. In this example, as "imposition setting", "SRA3, landscape, saddle stitching" is defined. This represents, as illustrated in FIG. 4(B), in a space of landscape paper of SRA3 size, which is slightly larger than A3 paper, two sheets of original (A4 size) are arranged with a saddle stitching arrangement order. In this case, SRA3 only represents a space for imposition and does not represent paper used for printing. To avoid complicated illustration, only paper for two pages is indicated.

"Job setting" defines a rule for print output. In this example, "both-sided specification", "page-range specification", "number-of-copies specification", "paper feed method (automatic, tray specification)", "slip sheet specification", "post-processing specification (stapling paper, punching a hole), and so on are defined.

"Both-sided specification" represents specification for printing images on both sides of paper.

"Page-range specification" represents specification of a range for print output (print output from what page to what page).

"Number-of-copies specification" represents specification as to the number of copies of a set to be output.

"Paper feed method (automatic, tray specification)" represents specification of a paper feed tray. In the case where a paper tray is not specified, the printing apparatus selects a paper feed tray.

"Slip sheet specification" represents specification for inserting a sheet of paper which represents a break between two copies, for the number of copies specified in "number-of-copies specification".

"Post-processing specification (stapling paper, punching a hole)" represents specification for a post-processing method such as stapling paper or punching a hole. In this example, as illustrated in FIG. 4(C), "specify tray 1 A4 LEF, scale to fit paper size" is specified. In this case, other specifications are not defined. That is, in this case, "one-sided printing, all page printing, one copy, no slip sheet, no post-processing" is set.

In the preview image 421 illustrated in FIG. 2, paper is indicated with the transport direction from left to right. Also in FIG. 4, the orientation of paper is the same as the indication on the preview image 421 of FIG. 2. In this case, "specify tray 1 A4 LEF, scale to fit paper size" is specified, and therefore, paper is rendered in portrait orientation such that paper is transported in the direction of arrow X.

In the case where "job setting" is set to "specify tray 2 A4 SEF, scale to fit paper size" not "specify tray 1 A4 LEF, scale to fit paper size", the preview image 421 of FIG. 2 is indicated such that paper is rendered in landscape orientation, as illustrated in FIG. 4(D).

When the "original" tab among the three tabs of "original", "simplified", and "output" for preview display illustrated in FIG. 2 is pressed, thumbnail images for individual pages of an original are directly indicated, as illustrated in FIG. 4(A). In contrast, when the "output" tab is pressed, an image based on output data generated by RIP processing is indicated. In the example illustrated in FIG. 4, an "output" image is the same as a "simplified" image. However, for example, if a particular setting for changing the color of a specific object among multiple objects constituting an image within one page is performed, a "simplified" image does not support the change in the color, but an "output" image represents an image with the changed color. Thus, only "output" images support some cases. However, in most cases, "simplified" images are sufficient for understanding of printing images.

In this exemplary embodiment, as processing for "simplified" preview display, processing described below is performed.

(Job Setting)

Number-of-Copies Specification and Sort Specification

The order of output pages varies according to number-of-copies specification and sort specification. Therefore, a preview image is displayed taking into consideration the number-of-copies specification and the sort specification.

Example 1

In the case where "four pages, two copies, sorting is specified" is set, preview images are displayed in the order of pages 1, 2, 3, 4, 1, 2, 3, and 4.

Example 2

In the case where "four pages, two copies, sorting is not specified" is set, preview images are displayed in the order of pages 1, 1, 2, 2, 3, 3, 4, and 4.

Paper Feed Method (Automatic, Tray Specification)

The size and orientation of paper to be used for printing varies according to specification of a paper feed method. Therefore, a preview image is displayed taking into consideration the paper feed method.

FIGS. 5A, 5B, and 5C are diagrams illustrating the relationship between specification of a paper feed method and a thumbnail image.

Example 1 in the case where "one page, portrait A4 original, automatic paper feeding" is set, priority is provided to LEF with a higher printing speed. Therefore, an image is displayed to fit A4 LEF, as illustrated in FIG. 5A.

Example 2

"one page, portrait A4 original, specify A3 SEF tray as paper feed method" is set, paper in the specified tray is used. Therefore, a preview image is displayed with a blank region to fit A3 SEF, as illustrated in FIG. 5B.

Example 3

"one page, portrait A4 original, specify A5 SEF tray as paper feed method" is set, paper in the specified tray is used. Therefore, a preview image is displayed such that an image of an original is clipped to fit A5 SEF and only a half image of the original is displayed, as illustrated in FIG. 5C.

Post-Processing Specification (Stapling Paper, Punching a Hole)

The orientation of paper to be used for printing varies according to post-processing specification. Therefore, a preview image is displayed taking into consideration the post-processing specification.

FIGS. 6A and 6B are diagrams illustrating preview images taking into consideration the orientation of paper based on the post-processing specification. Marks at the left end of each of FIGS. 6A and 6B represent a staple position.

For the printing apparatus according to this exemplary embodiment, stapling paper may be performed only at the rear end of paper in the paper transport direction, in terms of the mechanism of the printing apparatus. Thus, procedures described below are taken.

Example 1

In the case where "portrait A4 original, one page, stapling paper at upper part" is set, stapling paper needs to be performed at the upper end of a portrait image. Therefore, SEF paper is used. Thus, the image is rotated to fit SEF paper and is displayed as illustrated in FIG. 6A.

Example 2

In the case where "portrait A4 original, one page, stapling paper at left part" is set, stapling paper needs to be performed at the left end of a portrait image. Therefore, LEF paper is used. Thus, the image is rotated to fit LEF paper and is displayed as illustrated in FIG. 6B.

Printing Order Specification (Ascending Order, Descending Order)

The order of output pages for printing varies depending on whether printing is performed in an ascending order or a descending order. Therefore, an image is displayed taking into consideration the printing order specification.

Example 1

In the case where "four pages, ascending order" is set, images are displayed in the order of pages 1, 2, 3, and 4.

Example 2

In the case where "four pages, descending order" is set, images are displayed in the order of pages 4, 3, 2, and 1.
(Tray Setting Information)

The orientation of paper to be used for printing varies according to the orientation of paper set in the printing apparatus 20. Therefore, an image is displayed taking into consideration the tray setting information.

Example 1

In the case where "portrait A4 original, one page, automatic paper feeding" is set and both A4 SEF paper and A4 LEF paper are set at the printing apparatus 20, priority is provided to LEF paper with a higher printing speed. Therefore, an image is displayed to fit A4 LEF paper.

Example 2

In the case where "portrait A4 original, one page, automatic paper feeding" is set, A4 LEF paper is not set at the printing apparatus 20, and A4 SEF paper is set, A4 SEF paper is used. Therefore, an image is displayed to fit A4 SEF paper.

Figure 7:
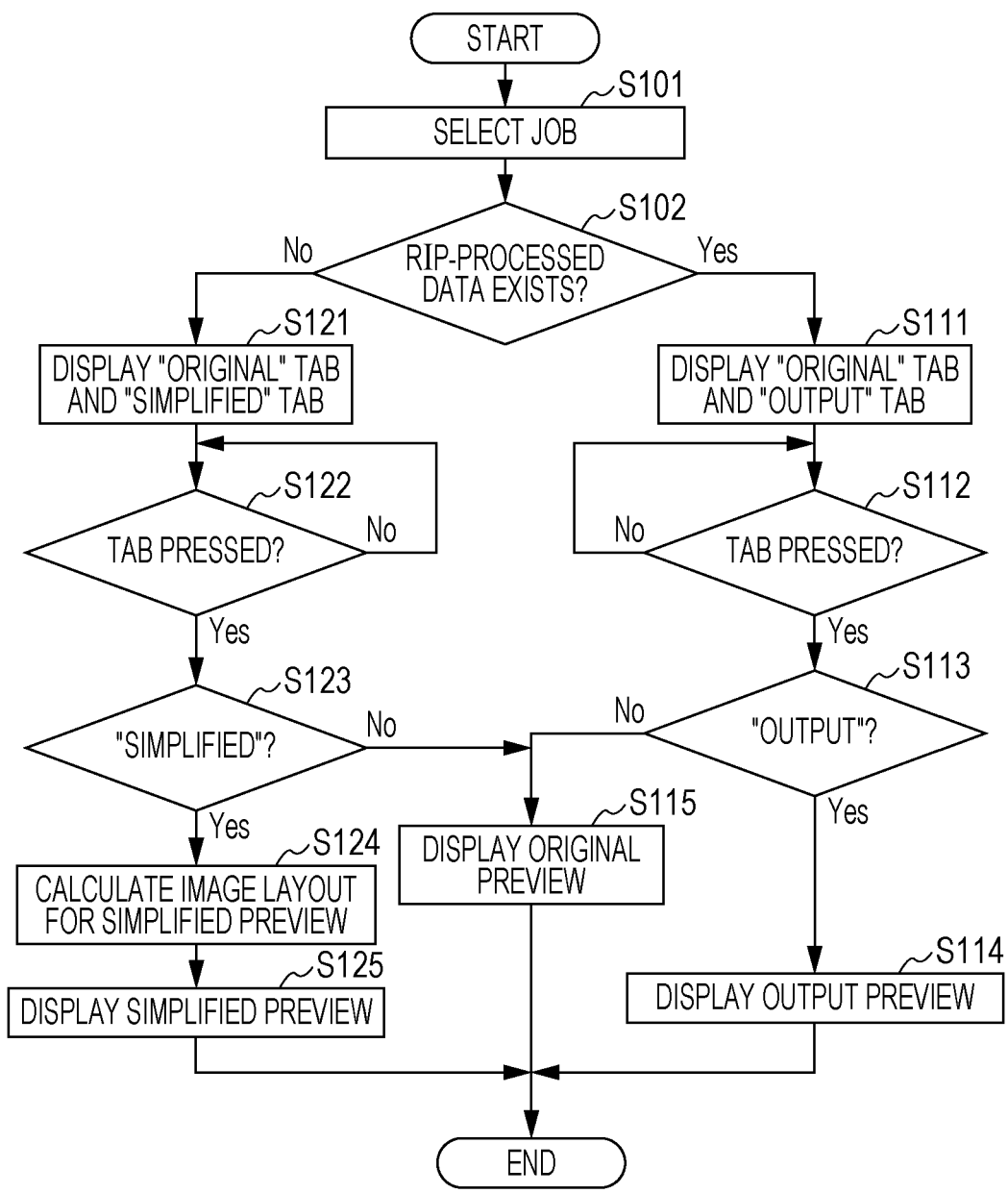
FIG. 7 is a diagram illustrating a flowchart of a preview display routine executed for displaying a preview image.

FIG. 7 is a diagram illustrating a flowchart of a preview display routine executed for displaying a preview image.

The preview display routine illustrated in FIG. 7 is a routine which is executed in response to selection of any job on the pending job list screen 41 illustrated in FIG. 2.

When a job is selected (step S101), it is determined whether or not RIP-processed output data corresponding to the job exists (step S102). In the case where RIP-processed output data exists, the "original" tab and the "output" tab among the three tabs for preview display illustrated in FIG. 2 are displayed (step S111). This is because in the case where RIP-processed output data exists, an "output" preview image is the most accurate image as a printing image, and a "simplified" preview image does not need to be displayed. In contrast, in the case where RIP-processed output data does not exist in the selected job, the "original" tab and the "simplified" tab among the three tabs for image display illustrated in FIG. 2 are displayed (step S121). This is because RIP processing has not yet been performed and an "output" preview image is thus not able to be displayed. The "original" tab is displayed, irrespective of whether or not RIP-processed output data exists. This is because there may be a need to confirm a thumbnail image of an original, irrespective of before or after RIP processing.

In the state in which the "original" tab and the "output" tab are displayed on the preview screen 42 illustrated in FIG. 2 (step S111), when one of the "original" tab and the "output" tab is pressed (step S112), it is determined whether the "output" tab or the "original" tab is pressed (step S113). When the "output" tab is pressed, an "output" preview image is displayed (step S114). When the "original" tab is pressed, an "original" preview image is displayed (step S115).

In contrast, in the state in which the "original" tab and the "simplified" tab are displayed on the preview screen 42 illustrated in FIG. 2 (step S121), when one of the "original" tab and the "simplified" tab is pressed (step S122), it is determined whether the "simplified" tab or the "original" tab is pressed (step S123). When the "simplified" tab is pressed, image layout for "simplified" preview is calculated (step S124), and a "simplified" preview image is displayed (step S125). When the "original" tab is pressed, an "original" preview image is displayed (step S115).

Figure 8:
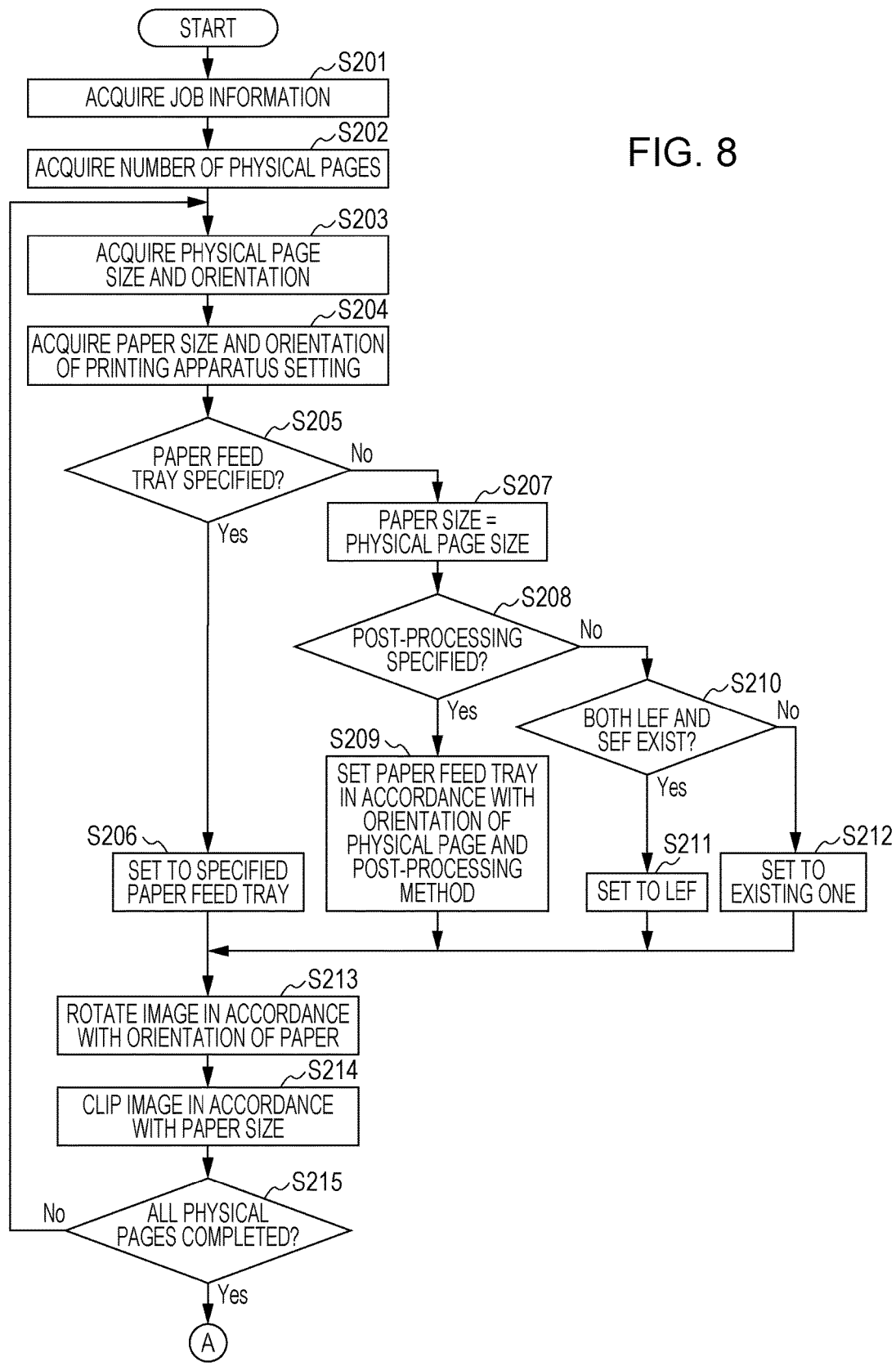
FIG. 8 is a diagram illustrating the first half of a flowchart of an image layout calculation routine for "simplified" preview.
Figure 9:
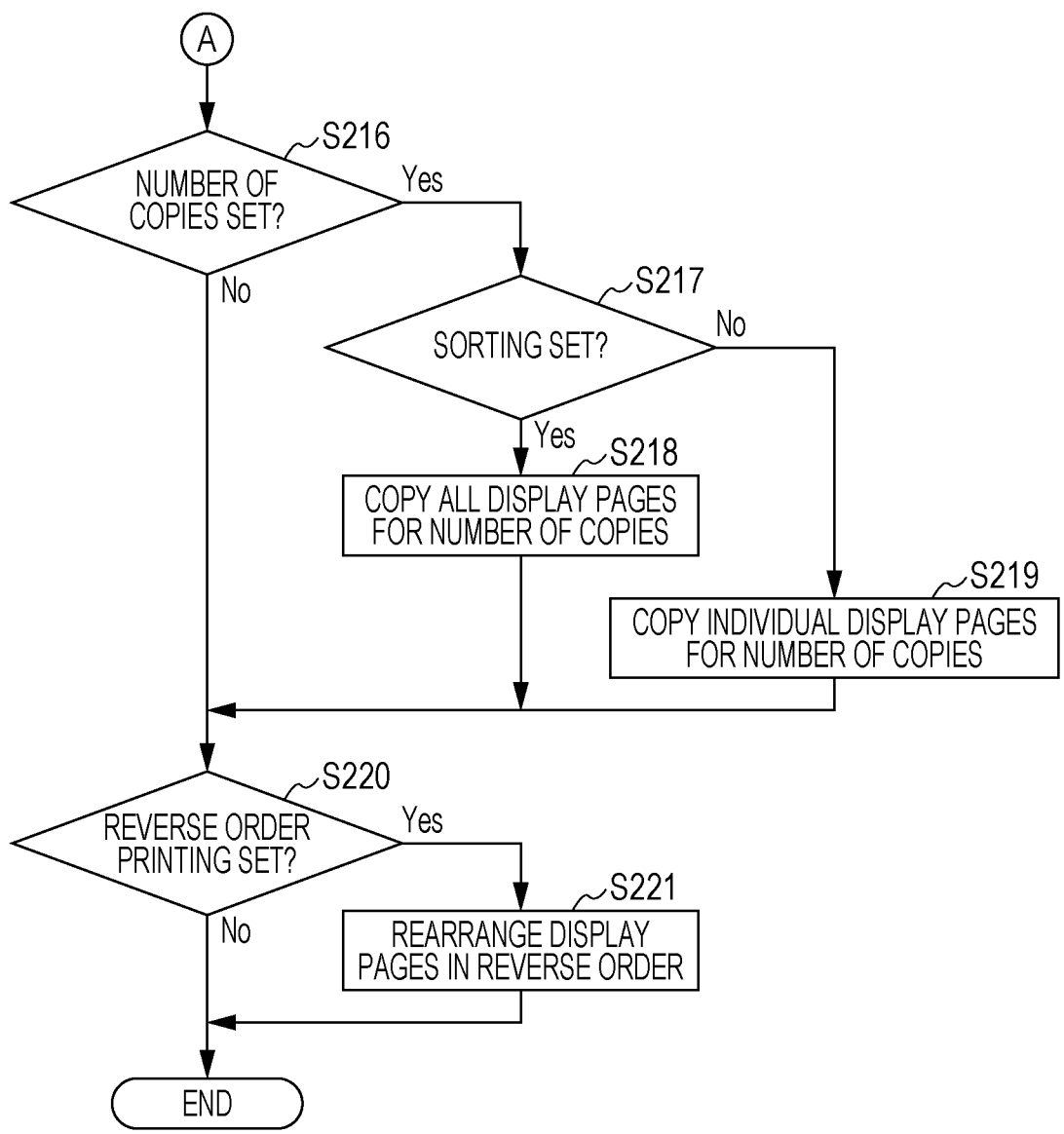
FIG. 9 is a diagram illustrating the second half of the flowchart of the image layout calculation routine for "simplified" preview.

FIGS. 8 and 9 are the first half and the second half of a flowchart of an image layout calculation routine for "simplified" preview which is executed in step S124 of the preview display routine illustrated in FIG. 7.

First, job information of a target job for the current preview display is acquired (step S201). Job information has been explained above with reference to FIG. 4. Therefore, redundant explanation will not be provided here.

Next, the number of physical pages is acquired with reference to the job information (step S202). The "number of physical pages" represents the number of sheets of paper to be print output (however, if an instruction for both-sided printing is issued, the number of sheets when the number of individual front faces and rear faces is counted, and the number of sheets for one copy even if the number of copies is specified).

Next, processing described below is performed sequentially for individual physical pages (refer to step S215).

First, information of the size and orientation of the physical page is acquired (step S203), and the size and orientation of paper set at the printing apparatus (tray setting information illustrated in FIG. 4) is acquired (step S204).

Next, it is determined whether or not a paper feed tray is specified for the job currently being processed (step S205). When a paper feed tray is specified, use of the specified paper feed tray for print output of the physical page is set (step S206).

In contrast, when a paper feed tray is not specified, use of paper of the same size as the current physical page is set (step S207), and it is determined whether or not post-processing is specified (step S208). When post-processing is specified, a paper feed tray is set such that the post-processing may be executed in accordance with the orientation of the physical page and the specified post-processing method (step S209). In contrast, when it is determined in step S208 that post-processing is not specified, it is determined whether or not paper feed trays for both LEF orientation and SEF orientation exist for the paper of the size set in step S207 (step S210). In the case where paper feed trays for both LEF orientation and SEF orientation exist, the paper feed tray for the LEF orientation is set (step S211). This is because for paper of the same size, LEF has a smaller dimension in the paper transport direction than SEF, and LEF orientation may achieve a larger number of sheets are print output per unit time. In the case where only a paper feed tray for one of the orientation and the SEF orientation exists for paper of the size set in step S207, the paper feed tray for the existing orientation is set (step S212).

After the paper feed tray is set as described above, the image is rotated to fit the orientation of paper to be used for printing (step S213). In the case where the size of paper is smaller than the size of the image, the image is clipped (step S214).

Processing of step S203 and later steps is sequentially performed for all the physical pages regarding the job of interest (step S215). When processing for all the physical pages is completed, it is determined whether or not the number of copies is set (FIG. 9, step S216). In the case where the number of copies is set, it is determined whether or not sorting is set (step S217). In the case where sorting is set, all the display pages are copied for the set number of copies (step S218). In contrast, sorting is not set, individual display pages are copied for the set number of copies (step S219).

Then, it is determined whether or not reverse order printing is set (step S220). In the case where reverse order printing is set, display pages are rearranged in the reverse order (step S221).

In step S124 illustrated in FIG. 7, the image layout calculation routine illustrated in FIGS. 8 and 9 is executed. In accordance with the calculation result, a "simplified" image is displayed (step S125).

The explanation has been provided above based on the assumption that the above preview display process and the like are executed within the printing apparatus 20 illustrated in FIG. 1. However, the printing apparatus may only have the function for simply performing print output in accordance with an instruction, and a server or the like may be provided separately from the printing apparatus so that the above process and the like may be performed at the server or the like. Alternatively, the above process may be performed within the client PCs 10. That is, an image display apparatus according to an exemplary embodiment and an information processing apparatus according to an exemplary embodiment may be built in a printing apparatus or may be separated from the printing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system including a client device which generates a job including a pair of first image data representing a set of first images and attachment data necessary for printing a second image based on the first image data, and a printing apparatus which includes a paper accommodation unit accommodating paper to be used for printing, receives the job from the client device, converts the first image data forming the job into second image data for printing by raster image processor (RIP) processing, and prints the second image based on the second image data on paper, the printing system comprising:
   a computer executing a program causing the computer to act as:
      a job specification unit which specifies any job in a stage previous to the conversion into the second image data by the RIP processing; and
      an image generation unit which generates, based on the attachment data forming the job specified by the job specification unit, a first image, the second image or a third image obtained by editing a thumbnail image based on the first image data forming the job, the third image being generated to a printing layout; and
   an image display which displays a selected one of the first image, the second image or the third image generated by the image generation unit, wherein
   when RIP-processed output data corresponding to the job exists, the image display displays a selected one of the first image and the second image, and
   when RIP-processed output data corresponding to the job does not exist, the image display displays a selected one of the first image and the third image.

2. The printing system according to claim 1, wherein the image generation unit generates an image including a thumbnail image which is imposed according to imposition for printing.

3. The printing system according to claim 1, wherein the image generation unit generates an image including a thumbnail image which is rotated in accordance with a transport direction of paper for printing.

4. The printing system according to claim 1, wherein the image generation unit generates an image including a thumbnail image and an image representing a blank sheet of paper or a thumbnail image part of which is cut out, in accordance with a size of the paper for printing.

5. The printing system according to claim 1, wherein the image generation unit generates an image including thumbnail images which are reproduced according to a number of copies for printing and rearranged according to whether or not specification of sorting is set.

6. The printing system according to claim 1, wherein the image generation unit generates an image including thumbnail images which are rearranged according to whether or not specification of reverse order printing is set.

7. An image display apparatus forming a printing system including a client device which generates a job including a pair of first image data representing a set of first images and attachment data necessary for printing a second image based on the first image data, and a printing apparatus which includes a paper accommodation unit accommodating paper to be used for printing, receives the job from the client device, converts the first image data forming the job into second image data for printing by raster image processor (RIP) processing, and prints the second image based on the second image data on paper, the image display apparatus comprising:

a computer executing a program causing the computer to act as:

a job specification unit which specifies any job in a stage previous to the conversion into the second image data by the RIP processing; and an image generation unit which, based on the attachment data forming the job specified by the job specification unit, generates: a first image, the second image, and a third image, the third image being obtained by editing a thumbnail image based on the first image data forming the job, the third image being generated to a printing layout; and an image display which displays a selected one of the first image, the second image or the third image generated by the image generation unit, wherein when RIP-processed output data corresponding to the job exists, the image display displays a selected one of the first image and the second image, and when RIP-processed output data corresponding to the job does not exist, the image display displays a selected one of the first image and the third image.

8. A non-transitory computer readable medium storing a program causing a computer to execute a process for image display including generating a job including a pair of first image data representing a set of first images and attachment data necessary for printing a second image based on the first image data, and accommodating paper to be used for printing, receiving the job, converting the first image data forming the job into second image data for printing by raster image processor (RIP) processing, and printing the second based on the second image data on paper, the process comprising:

specifying any job in a stage previous to the conversion into the second image data by the RIP processing;

generating, based on the attachment data forming the specified job, a first image, the second image or a third image obtained by editing a thumbnail image based on the first image data forming the job, the third image being generated to a printing layout; and displaying a selected on of the generated first image, second image or third image, wherein when RIP-processed output data corresponding to the job exists, the image display displays a selected one of the first image and the second image, and when RIP-processed output data corresponding to the job does not exist, the image display displays a selected one of the first image and the third image.

* * * * *